United States Patent [19]

Peng

[11] Patent Number: 5,408,103
[45] Date of Patent: Apr. 18, 1995

[54] SYMBOL CODE READER USING SIGNAL SELECTION FOR A PREDETERMINED SET OF PHOTOSENSITIVE ELEMENTS

[75] Inventor: Ke-Ou Peng, Delft, Netherlands

[73] Assignee: Opticon Sensors Europe B.V., Hoofddorp, Netherlands

[21] Appl. No.: 225,240

[22] Filed: Apr. 8, 1994

Related U.S. Application Data

[63] Continuation of Ser. No. 895,896, Jun. 9, 1992, abandoned.

[51] Int. Cl.$^6$ ............................................. G06K 7/10
[52] U.S. Cl. ...................................... 250/566; 235/462
[58] Field of Search .................... 250/566, 568, 208.2; 235/454, 462, 472

[56] References Cited

U.S. PATENT DOCUMENTS

| | | | |
|---|---|---|---|
| 4,408,344 | 10/1983 | McWaters et al. | 235/462 |
| 4,822,986 | 4/1989 | Guthmueller et al. | 235/462 |
| 4,877,949 | 10/1989 | Danielson et al. | 235/454 |

FOREIGN PATENT DOCUMENTS

| | | |
|---|---|---|
| 0164012 | 12/1985 | European Pat. Off. . |
| 0385478 | 9/1990 | European Pat. Off. . |
| 2346778 | 10/1977 | France . |

*Primary Examiner*—David C. Nelms
*Assistant Examiner*—Stephone B. Allen
*Attorney, Agent, or Firm*—Parmelee, Bollinger Bramblett

[57] ABSTRACT

A symbol code reader comprises a two-dimensional array of photosensitive elements for converting light scattered by the symbol code into image signals representative of the symbol code, image storage means for storing image signals produced by the photosensitive elements, and selection means for selectively passing image signals from the photosensitive elements to the image storage means. Preferably, the selection means are arranged for passing the image signals from predetermined sets of photosensitive elements, the elements of each set constituting a pattern in the array.

15 Claims, 4 Drawing Sheets

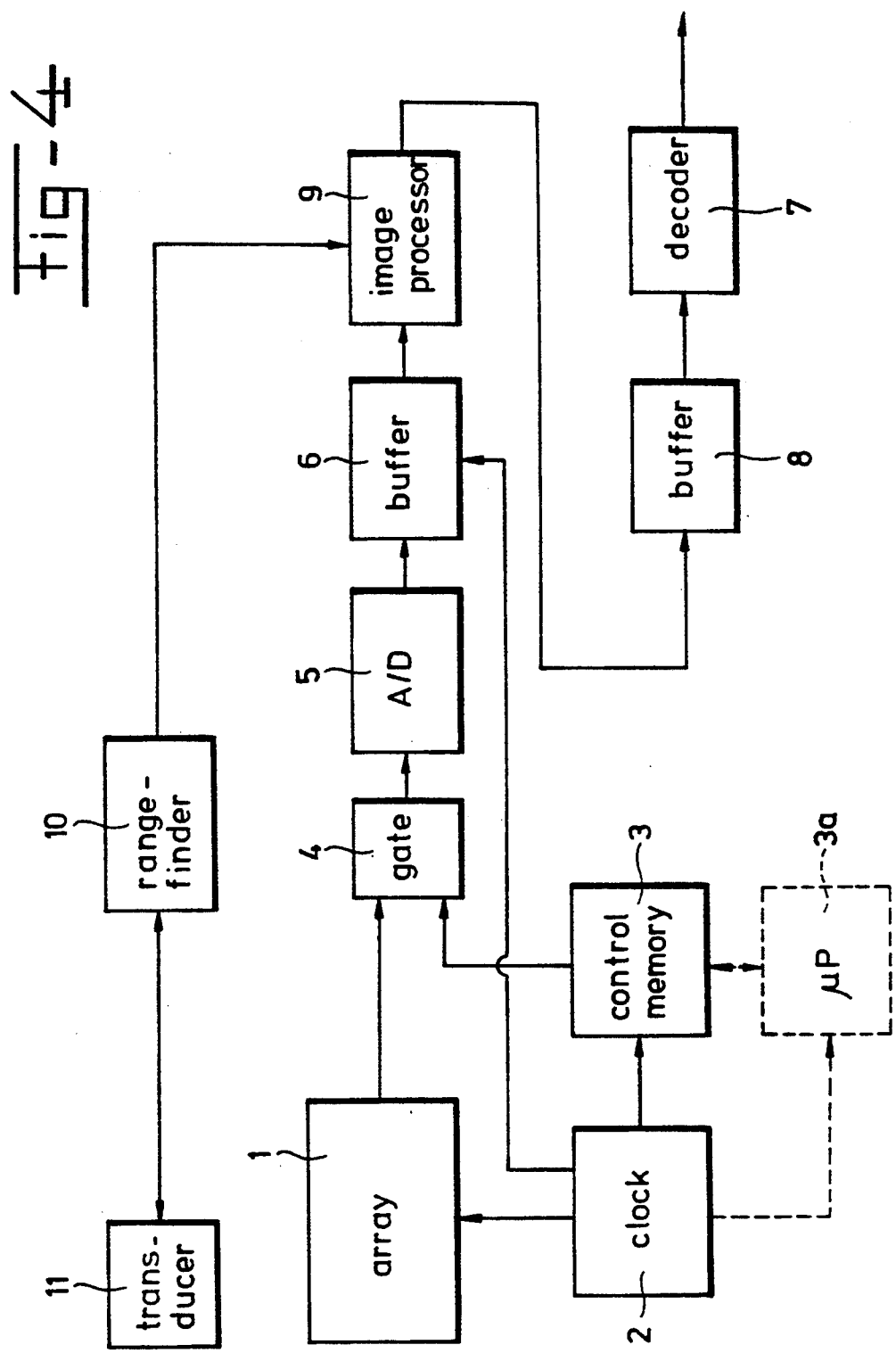

SYMBOL CODE READER USING SIGNAL SELECTION FOR A PREDETERMINED SET OF PHOTOSENSITIVE ELEMENTS

This application is a continuation of Ser. No. 07/895,896 as originally filed on Jun. 9, 1992 now abandoned.

BACKGROUND OF THE INVENTION

The invention relates to a symbol code reader, comprising a two-dimensional array of photosensitive elements for converting light scattered by the symbol code into image signals representative of the symbol code, and image storage means for storing image signals produced by the photosensitive elements. Such a symbol code reader is generally known.

In symbol code readers, both two-dimensional arrays of photosensitive elements, such as area CCD-arrays, as well as one-dimensional arrays, such as linear CCD-arrays, can be used. Both types of arrays have specific advantages and disadvantages. Which type of array is used often depends on the type of code which is to be read. Many symbol codes, e.g. bar codes, have a linear structure. The Universal Product Code (UPC) for instance consists of a number of parallel bars extending perpendicularly to the general axis of the code. Because of this linear structure, it is possible to read such a code using a single row, i.e. a linear array, of photosensitive elements. However, in order to be able to read the code properly, it is necessary that the axis of the code is approximately aligned with the array. This alignment can be achieved by either moving the reader and the code into an approximately parallel mutual position, or by using image rotation means for optically rotating the image of the symbol code relative to the array.

Symbol code readers having a two-dimensional array of photosensitive elements have the advantage of being comparatively insensitive to the orientation of the symbol code relative to the array. There is no need to rotate the code in order to achieve alignment with the array, since the code can be read under almost any angle. Two-dimensional arrays however have the disadvantage of producing a multiple of the output signals (image signals) produced by a linear array. Whereas a linear CCD-array may contain 1000 photosensitive elements, an area CCD-array having the same resolution contains $1000 \cdot 1000 = 1000000$ elements. As each photosensitive element produces an image signal, a total of $10^6$ image signals are outputted by the array. In order to deal with such a large number of image signals, a symbol code reader having a two-dimensional array of photosensitive elements should include relatively complex signal processing equipment. Considering the number of signals to be processed, the total processing time must necessarily be long.

It is therefore an object of the present invention to provide a symbol code reader having a two-dimensional array in which the number of image signals to be processed is greatly reduced.

It is a further object of the present invention to provide a symbol code reader having a two-dimensional array which produces no more image signals when reading one-dimensional codes than a reader having a one-dimensional array.

It is still a further object of the present invention to provide a symbol code reader which is virtually independent of the orientation of the symbol code relative to the reader and yet requires relatively simple signal processing means and short processing time.

SUMMARY OF THE INVENTION

Of the image signals produced by a two-dimensional array of photosensitive elements, most signals are superfluous, since a linear symbol code can also be read by using a (properly aligned) one-dimensional array. Even two-dimensional symbol codes having several parallel rows of symbols can be read using a limited number, i.e. only several rows, of photosensitive elements. The symbol code information can therefore be derived from only a relatively small number of signals. As most signals produced by the array can be discarded, only a limited number of selected signals need be stored in the image storage means. The symbol code reader according to the invention is therefore characterized in that it comprises selection means for selectively passing image signals from the photosensitive elements to the image storage means.

By limiting the number of signals passed from the array to the storage means, it is possible to avoid storing redundant or superfluous image signals. The size of the image storage means can be drastically reduced, while due to the limited number of stored data, signal processing, such as decoding, can be performed much more quickly, using much simpler signal processing equipment.

In many applications it is known in advance which parts of the array are most likely to produce relevant information. According to a preferred embodiment of the invention, the selection means are arranged for passing the image signals from predetermined sets of photosensitive elements, the elements of each set constituting a pattern in the array. Each set of photosensitive elements forms a part of the array which is known to contain the symbol code information, or which is likely to contain that information. The selection of the specific patterns can be based on the particular type of symbol code to be read, the orientation of the code relative to the array, or other factors.

It should be understood that the sets of photosensitive elements are only predetermined in the sense that the actual values of the image signals do not influence the selection. That is, the selection of a particular image signal is determined before the signal reaches the selection means. This does not necessarily mean that a particular selection is fixed, or that the set of signals to be selected cannot be altered.

If, for example, an area CCD-array is used for reading a linear (one-dimensional) bar code, the bar code information is contained in the signals produced by the photosensitive elements which are aligned with the axis of the symbol code. The pattern formed by the photosensitive elements the signals of which are selected is in this case preferably a straight line or a set of straight lines. According to a preferred embodiment of the invention a pattern therefore comprises a straight line. For some applications, however, a curved line may be used.

In case the symbol code is imaged onto the array approximately parallel to its rows or columns, the pattern can advantageously consist of one row and/or one column of array elements. This facilitates the selection of the image signals.

Of course it is possible to successively apply different patterns to the image of one symbol code. This can, for instance, be done on a trial-and-error basis, repeating the reading and selecting operation until the symbol code information has been read. The successive patterns can be varied in several ways. According to one embodiment of the invention, the patterns of successive sets are rotated relative to each other. According to another embodiment, the patterns of successive sets are shifted relative to each other. In the preferred embodiment of the invention, however, these two ways of varying successive patterns are combined.

The selection means are to selectively pass image signals to the image storage means. The selection operation can be accomplished in several ways. Preferably the selection means comprises gate means responsive to gate control signals. The gate means can either be analog or digital, depending on the type of signal fed to the gate means. A digital gate means usually includes an AND-gate, and an analog gate means may be constituted by an operational amplifier. It should be understood that the gate means may form an integral part of the image storage means, e.g. when the gate control signals are fed directly to, say, an "enable" input of a shift register.

The gate control signals may be fed to the gate means in several ways. According to a preferred embodiment of the invention, the selection means comprise control storage means for storing control signals corresponding with the image signals to be selected. The control signals can be permanently stored in the control storage means, in which case the control storage means may comprise a ROM or EPROM type memory. A more flexible arrangement can be achieved if the control storage means comprise a RAM type memory. In one embodiment of the invention the selection means comprise a microprocessor for producing control signals. The microprocessor provides a way to adapt the selection patterns to a particular situation.

Although various types of arrays can be used, the array of photosensitive elements is preferably a CCD-array.

Since the symbol code reader according to the invention produces a limited number of image signals, preferably no more than the number of image signals outputted by a comparable linear array, bar code image processing operations become possible, which otherwise would not have been feasible. According to an embodiment of the invention, the reader further comprises image restoration means operative on the image signals stored in the image storage means.

If the image of the bar code on the array is very poor, it cannot be decoded. The most common and important cause for this is the image being out of focus. Without refocussing, the bar code image may be restored by means of e.g. deblurring processing. For this purpose the image restoration means may comprise a deblurring device, such as a filter. Preferably the reader further comprises range finding means for producing a distance signal, the deblurring device being a distance-dependent filter responsive to the distance signal. In this way a blurred image of the symbol code can effectively be deblurred using relatively simple one-dimensional deblurring means operating on a limited number of image signals.

BRIEF DESCRIPTION OF THE DRAWINGS

The invention will be further explained under reference to the accompanying drawings.

FIG. 3 shows schematically a first embodiment of the symbol code reader according to the invention.

FIG. 4 shows schematically a second embodiment of the symbol code reader according to the invention.

DETAILED DESCRIPTION OF THE EMBODIMENT

Figure 1A:
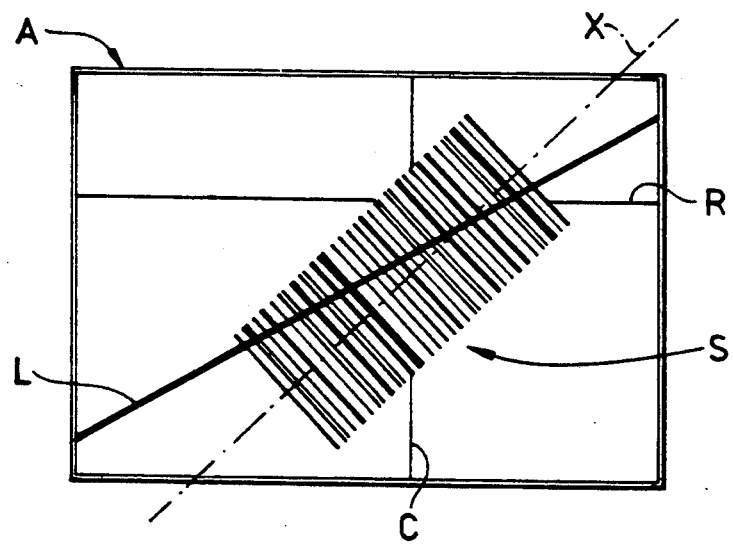
FIGS. 1a and 1b show the principle of reading a bar code using selected elements of an array.

In FIG. 1a, a symbol code S is imaged on an array A of photosensitive elements (for the sake of clarity the individual elements are not shown). The axis X of the depicted code S is situated at an angle to the array A. It is obvious from FIG. 1 that with a two-dimensional array the code can be read irrespective of the angle to the array, as long as the entire code is imaged on the array.

Conventionally the image signals of the entire array are read and stored in a memory, after which the image signals are processed to recover the code information. According to the invention however, only a limited set of signals is read, stored and processed. As can be seen in FIG. 1a, the image of the code does not cover the entire array, but only parts of it. Consequently, the image signals of many array elements will contain no code information and are therefore superfluous. Of the array elements on which the code is imaged, many will produce redundant information since a linear code, such as the code depicted in FIG. 1a, can in principle be read using a linear, i.e. one-dimensional, array of photosensitive elements. A single line of photosensitive elements, approximately parallel to the axis X of the code S, will therefore suffice for reading the linear code S. The signals produced by all other elements can be discarded.

In FIG. 1a, a line L depicts a set of elements which can be used for reading the code S. The line L intersects all bars of the code, thus making it possible to recover the information of the entire code in one read operation. From FIG. 1a it is clear that in the example shown the orientation of the code S is such that it cannot be read using a single row R or a single column C of photosensitive elements. However, a symbol code S having an axis X which is substantially parallel to e.g. the row R can be read using only the elements of the row R.

Figure 1B:
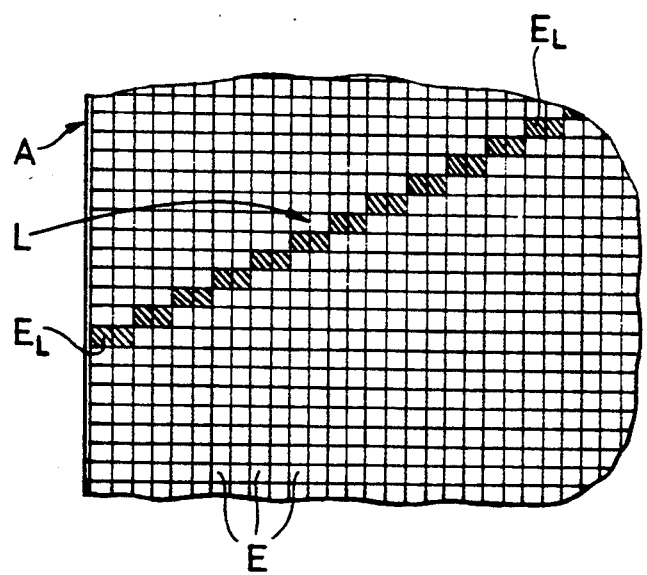

FIG. 1b shows part of the array A of FIG. 1a in greater detail. Of the elements E of the array A, the elements $E_L$ constitute the line L. As can be seen in FIG. 1b, the width of the line L is one element, each column of the array A containing only one element $E_L$. The line L as depicted therefore has the same number of elements as a single row of the array. In other words, the line L contains the same number of elements as a linear array having the same resolution and length as the two-dimensional array A. Note that for arrays having less elements per column than per row, a line L having a width of one element may have less elements than the number in one row. Of course it is possible to use selected sets constituting a line having a greater width than one element. Although such sets normally would comprise redundant information, in some instances it may be advantageous to purposely read some redundant information, e.g. for error correction.

As the orientation of the code relative to the array is often not known in advance, it may be necessary to read the array repetitively, using different sets of selected elements. The line L in FIGS. 1a and 1b, depicting one such selection set, may be produced by rotating a straight selection line around the geometric center of the array. After each read operation, the line L is rotated over an angle of e.g. 20° until the code information is recovered.

Figure 2A:
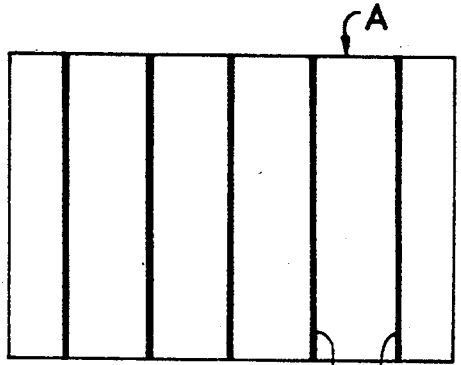
FIGS. 2a, 2b, 2c, 2d, 2e and 2f show examples of selection patterns.
Figure 2B:
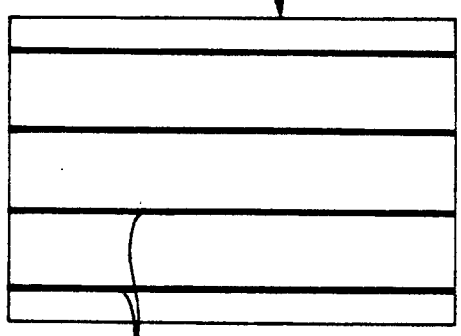
Figure 2C:
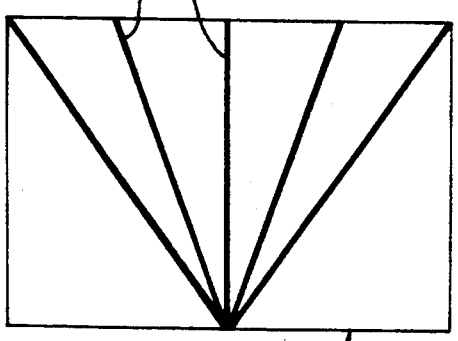
Figure 2D:
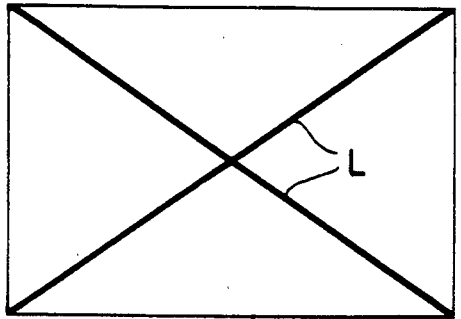
Figure 2E:
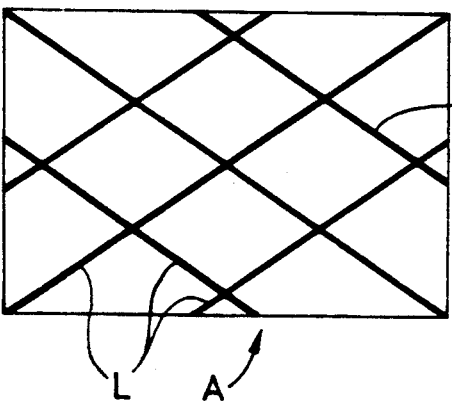
Figure 2F:
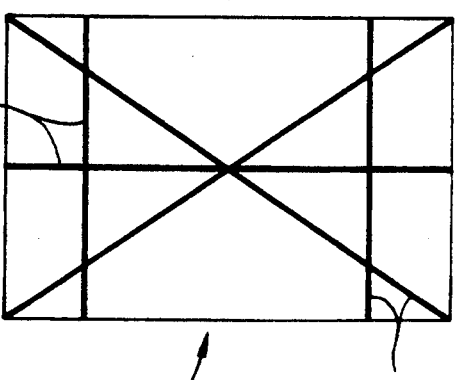
Figure 2:
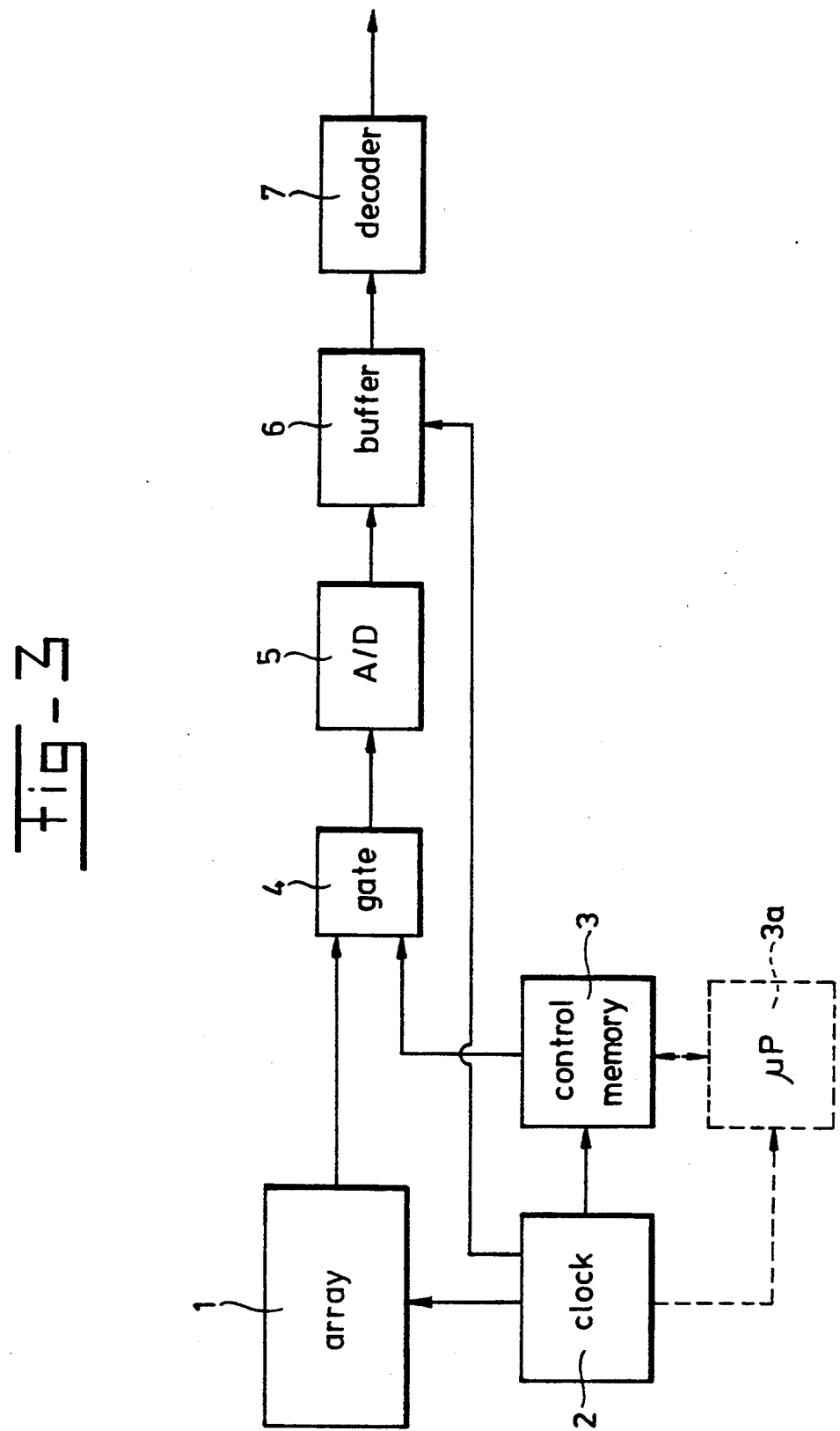

FIG. 2 shows schematically alternative selection patterns, each selection pattern being indicated by a line L. In FIG. 2a, the selection patterns coincide with columns of the array. Preferably the lines L shown in FIG. 2a are used separately in succession for reading the array, so that only a relatively small number of image signals need to be produced. It is however also possible to apply the selection lines L simultaneously. In this case a larger memory is needed for storing the image signals produced. Similarly, the lines L shown in the FIGS. 2b–2e could be applied successively or simultaneously. In FIG. 2b, the selection lines L coincide with rows of the array. In FIG. 2c, the lines are rotated relative to each other. Although the axis of the rotation is shown to be one particular point of the array, other axes are of course possible, e.g. the center or one of all four corners of the array. FIG. 2d shows a pattern of two crossing lines L. This pattern can be rotated around the geometric center of the array. FIGS. 2e and 2f show patterns comprising a multitude of lines L. Again, these selection lines L can be applied either simultaneously or successively.

FIG. 3 shows schematically a first embodiment of the symbol code reader according to the invention. The symbol code reader comprises an array 1 of photosensitive elements, a clock generator 2, a control memory 3, a gate 4, an analog/digital-(A/D-)convertor 5, a buffer 6 and a decoder 7. The means for imaging the symbol code on the array 1 have been omitted for the sake of clarity. The array 1, which preferably is a CCD-array and which corresponds to the array A in FIGS. 1a, 1b, and 2a-f receives clock signals from the clock generator 2. These clock signals, which may include horizontal, vertical as well as frame clock signals, are also fed to the control memory 3, while the frame clock is also fed to the buffer 6. As most commercially available CCD-arrays do not permit addressing of the individual photosensitive elements, the image signals of all array elements have to be read by feeding the clock signals to the array 1. These image signals are fed to the gate 4. Since CCD-arrays usually produce a serial output of analog signals, the gate 4 can be an analog switch and conversion to binary (digital) can take place at a later stage. A digital gate can be used if the A/D-convertor 5 is placed between the array 1 and the gate 4.

After being converted into digital signals, the selected image signals are stored in a buffer 6. This buffer can be a RAM type memory, a shift register, or the like. The image signals corresponding to one selection pattern, or possibly a number of selection patterns, are subsequently outputted to the decoder 7. The buffer 6 can output these signals when a predetermined number of image signals has been received, or upon receipt of a frame clock signal from the clock generator 2. The decoder 7 decodes the symbol codes information and produces an output signal corresponding with that information.

The control storage 3, which preferably includes a RAM or ROM type memory, contains the control signals which determine the selection of the image signals. Upon receipt of the clock signals from the clock generator 2, the control storage produces signals which control the gate 4. These control signals can be stored in the control storage 3 as rows of logical "1" and logical "0" values, each value corresponding with an array element, and each logical "1" with an element the image signal is to be selected. In the control storage 3, many successive selection patterns may be stored in this way. It is also possible to provide a microprocessor 3a for generating selection patterns. By using a microprocessor 3a, it is possible to generate a large variety of selection patterns depending on the particular application. The microprocessor may be programmed in such a way, that the operator of the reader can supply data concerning the particular symbol code or the specific application, upon which the microprocessor generates adapted selection patterns. With a microprocessor it is also possible to use a relatively small control storage 3, since there is no need to store a large number of selection patterns, as these patterns can be generated by the processor. The program of the micrprocessor may be stored in a separate memory (not shown), or a part of the control storage 3 may be reserved for this purpose.

FIG. 4 shows schematically a second embodiment of the symbol code reader according to the invention. In addition to an array 1 of photosensitive elements, a clock generator 2, a control memory 3, a gate 4, an A/D-convertor 5, a buffer 6 and a decoder 7, this embodiment of the inventive symbol code reader comprises a further buffer 8, an image processor 9, and a range finder 10 with a transducer 11. The symbol code reader may also comprise an optional microprocessor 3a.

In this embodiment, the (analog) image signals selected by the gate 4 are fed to an analog/digital convertor 5. The image signals are stored in digital form in a buffer (memory) 6. An image processor 9 operates on digital image signals stored in the buffer 6. The operations performed by the image processor 9 may comprise deblurring by performing filtering, such as inverse and Wiener filtering. Note that the processing time is greatly reduced by operating upon selected image signals, i.e. by filtering the signals corresponding to one or a few selection lines, as compared with conventional image processing operating upon the image signals of the entire two-dimensional array.

The embodiment shown in FIG. 4 further comprises a range finder 10, for instance an ultrasonic ranger with an ultrasonic transducer 11. The ultrasonic transducer 11 produces ultrasonic pulses which are emitted towards the symbol code (not shown). Upon receipt of the reflected pulses, the delay between emission and reception is used by the ultrasonic range finder 10 to produce a signal indicative of the distance between the symbol code (not shown) and the array 1. This distance signal can be used by the image processor 9 to adapt its filter, thus providing a distance-dependent deblurring filter. Instead of the (ultrasonic) range finder 10, other means for determining the distance between the bar code and the array 1 may be used, such as an optical range finder.

The digital filtered signals output by the image processor 9 are fed to the buffer 8 and subsequently to the decoder 7. It is of course possible to utilize an image processor including a buffer, in which case the buffer 8 can be omitted. Similarly, the buffer 6 can be also part of the image processor 9. The gate 4 can be omitted if the control signals are fed to an "enable" or similar input of the A/D-convertor 5.

I claim:

1. A symbol code reader for reading a symbol code, comprising:

a two-dimensional array of photosensitive elements for converting light scattered by the symbol code into image signals representative of the symbol code, image storage means for storing image signals produced by said photosensitive elements, selection means connected between said two-dimensional array and said image storage means, arranged to receive said image signals and to select a predetermined number of said image signals upon receipt by said selection means according to a predetermined selection pattern which is only related to a predetermined set of said photosensitive elements and to transfer only said predetermined number of said image signals to said image storage means.

2. A symbol code reader according to claim 1, wherein said selection means comprise gate means connected to receive said image signals and to selectively transfer said image signals in dependence on gate control signals.

3. A symbol code reader according to claim 2, wherein said selection means comprise control storage means for storing control signals corresponding to said predetermined selection pattern, which control storage means is connected to said gate means to provide said gate with control signals.

4. A symbol code reader according to claim 1, wherein the selection means comprise a microprocessor for producing control signals.

5. A symbol code reader for reading a symbol code according to claim 1 and further comprising:

image restoration means operative on said limited, predetermined number of image signals stored in said image storage means.

6. A symbol code reader according to claim 5, wherein said image restoration means comprise deblurring means.

7. A symbol code reader according to claim 6, further comprising range finding means for producing a distance signal, and said deblurring means comprising a distance-dependent filter responsive to said distance signal.

8. A symbol code reader according to claim 1, wherein the selection pattern corresponds to a set of photosensitive elements on a straight line.

9. A symbol code reader according to claim 1, wherein the predetermined set of photosensitive elements corresponds to a row of array elements.

10. A symbol code reader according to claim 1, wherein the predetermined set of photosensitive elements corresponds to one column of array elements.

11. A symbol code reader according to claim 1, wherein the predetermined set of photosensitive elements corresponds to a curved line.

12. A symbol code reader according to claim 1, wherein selection patterns of successive sets are applied and wherein said successive sets are rotated relative to each other.

13. A symbol code reader according to claim 1, wherein selection patterns of successive sets are applied and the patterns of said successive sets are shifted relative to each other.

14. A symbol code reader according to claim 1, wherein the selection patterns are stored in a control memory.

15. A symbol code reader according to claim 1, wherein the selection patterns are generated by a microprocessor.

* * * * *